| United States Patent [19] | [11] | 4,268,642 |
|---|---|---|
| Gunesin et al. | [45] | May 19, 1981 |

[54] BUTADIENE-STYRENE-VINYL BENZYL CHLORIDE TERPOLYMERS

[75] Inventors: Binnur Gunesin, Uniontown, Ohio; Adel F. Halasa, Safat, Kuwait

[73] Assignee: The Firestone Tire & Rubber Company, Akron, Ohio

[21] Appl. No.: 132,744

[22] Filed: Mar. 24, 1980

[51] Int. Cl.$^3$ .................................................. C08F 8/32
[52] U.S. Cl. ...................................... 525/382; 526/227; 526/229; 526/230; 526/232.1; 526/293
[58] Field of Search .......................... 525/382; 526/293

[56] References Cited

U.S. PATENT DOCUMENTS

| 2,364,186 | 12/1944 | Bersworth | 525/382 |
| 2,649,429 | 8/1953 | Little | 525/382 |
| 3,104,235 | 9/1963 | Kuntz et al. | 525/382 |
| 3,230,273 | 1/1966 | van der Nuet et al. | 525/382 |
| 3,843,566 | 10/1974 | Barrett | 525/382 |
| 3,900,532 | 8/1975 | Dietrich et al. | 525/382 |

OTHER PUBLICATIONS

Chem. Abstracts 93:47555v, p. 26, vol. 93 (1980).
Chem. Abstracts 86:172773w, p. 68, vol. 86 (1977).

*Primary Examiner*—William F. Hamrock

[57] ABSTRACT

The terpolymers disclosed herein comprise 60–87 percent by weight butadiene, 10–30 percent styrene and 3–15 percent vinyl benzyl chloride in the polymer molecules. These are prepared by emulsion polymerization using a free radical generating initiator system. These terpolymers have excellent green strength and are useful in tire compositions.

7 Claims, No Drawings

BUTADIENE-STYRENE-VINYL BENZYL CHLORIDE TERPOLYMERS

BACKGROUND OF THE INVENTION

1. Field of the Invention

This invention relates to a terpolymer containing a major proportion of butadiene together with minor amounts of styrene and vinyl benzyl chloride. More specifically it relates to such terpolymers having excellent green strength and being suitable for incorporation in compositions used in tire manufacture and in related products.

2. Related Prior Art

Vinyl benzyl chloride copolymers with styrene have been used in various applications including coating compositions, ion-exchange resins, thickening agents, etc. In most applications vinyl comonomers such as styrene have been the major components.

U.S. Pat. No. 3,072,588 is directed primarily to the preparation of latices of polymers and copolymers containing at least 5 percent of vinyl benzyl halide in the polymer molecules with the comonomers comprising monoalkenyl monomers, such as styrene, and in some cases up to 1 percent of a crosslinking agent containing two vinyl groups such as divinylbenzene. This patent discloses in a table in Col. 3 three terpolymers of styrene, butadiene and vinyl benzyl chloride. However, in none of these terpolymers is butadiene used as a major component. Moreover the product in each case is a latex of finely divided particles having a size of 1,000 Angstroms or less.

SUMMARY OF THE INVENTION

In accordance with the present invention it has been found that terpolymers containing a major portion of butadiene, that is 60-87 percent by weight, preferably 65-80 percent of butadiene, and minor proportions of styrene and vinyl benzyl chloride may be prepared which have excellent green strength and are suitable for use in tire compositions. In these terpolymers the styrene proportion is advantageously 10-30 percent, preferably 15-25 percent by weight and the vinyl benzyl chloride proportion is 3-15 percent, preferably 8-12 percent by weight.

These terpolymers are advantageously prepared by emulsion polymerization using a free radical-generating initiator, such as a peroxy compound, advantageously in combination with a reducing activator such as an alkyl amine.

In place of the styrene, numerous homologous compounds may be used including vinyl toluene, alphamethylstyrene, vinyl naphthalene, p-chloro-styrene, p-isopropyl-styrene, p-ethyl-styrene, etc.

Moreover, other conjugated dienes of 4-10 carbon atoms may be used in place of the butadiene including isoprene, 2,3-dimethyl-butadiene, 2-phenyl-butadiene, 2-chloro-butadiene, 1,3-pentadiene, etc.

Furthermore, while the preferred vinyl benzyl chloride is the 4-vinyl benzyl chloride isomer, it is also suitable to use the 2-vinyl and the 3-vinyl isomers as well as the corresponding vinyl benzyl bromide isomers and the 2-methyl-4-vinyl benzyl chloride, 2-ethyl-4-vinyl benzyl chloride, 4-methyl-2-vinyl-benzyl chloride, etc.

Suitable initiators for preparing the terpolymers comprise $K_2S_2O_8$, $Na_2S_2O_8$, $(NH_4)_2S_2O_8$, ditertiarybutyl peroxide, diisopropyl benzene hydroperoxide, dibenzoyl peroxide, etc. Reducing activators that may be used include conventional alkali metal pyrosulfites, alkyl mercaptans, alkali metal formaldehyde sulfoxylates, alkali metal sulfites, alkali metal bisulfites, etc.

Since the polymerization is generally not taken to complete conversion and since the butadiene has a greater tendency for polymerization under the conditions used, the percent of butadiene is generally somewhat higher in the polymer molecules than in the monomer mixture and the other monomers are slightly lower in percent in the polymer than in the starting mixture. Consequently in order to obtain the desired proportions in the polymer it is advisable to take this fact in consideration in determining the proportions of monomers to use. Therefore it is generally desirable to have about 2-5 percent more of the styrene and of the vinyl benzyl chloride in the monomer mixture than is amined for in the polymer molecules. Accordingly the monomer mixtures generally contain 55-82 percent, preferably 60-75 percent butadiene, 12-35 percent, preferably 17-30 percent styrene and 5-20 percent, preferably 10-15 percent vinyl benzyl chloride.

The polymerization mixture generally has an emulsifying agent such as sodium lauryl sulfate. Other satisfactory emulsifying agents are well known in the emulsion polymerization art. Generally at least 50 percent of the polymerization mass comprises the water which is the supporting medium for the emulsified particles of monomer and ultimately of polymer products. The remainder of the reaction mass comprises the monomeric mixture which may be as much as 50 percent by weight but generally no more than about 35 percent of the mass. Also present are an initiator and possibly an activator or reducing agent for the initiator, and possibly one or more modifiers that may be desired to alter favorably the properties of the polymer product.

The polymerization is generally conducted at a temperature no lower than 0° C. because of the very slow polymerization rate at such low temperatures. Generally a polymerization temperature of 0-35° C. is advantageous, preferably 5-25° C. Molecular weights are generally in the range of 20,000 to 250,000, preferably 50,000 to 150,000 as measured by osometry ($M_n$).

In order to promote polymerization it is generally desirable to have a free radical generating initiator such as one of the peroxy compounds listed above, advantageously in a proportion of 0.1-5 percent, preferably 0.5-2 percent, based on the weight of monomeric material. It is also desirable in most cases also to have an activator present such as an amine or an iron++ salt to trigger or activate the peroxy compound into generation of free radicals and thereby initiate polymerization. Such activators are advantageously present in a proportion of about 0.01-5, preferably 0.1-2 percent based on the weight of monomer. Mercaptans may also be used as molecular weight control agents, acting as transfer agents to control the molecular weight.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

The various polymerizations described below are preformed in 10 ounce bottles capped with a rubber septum through which various additions can be made by hypodermic needle after the cap is affixed to the bottle. The bottles are cleaned and dried before use.

EXAMPLE I

A 10 oz. bottle is charged with 100 gms. of distilled water and 2.5 gms. of emulsifier (sodium lauryl sulfate). The water-soluble initiator (0.3 gms. diisopropyl benzene hydroperoxide) is charged together with 0.1 gm. of n-dodecyl mercaptan. The air is swept out of the bottle by a stream of nitrogen. Styrene (14.0 gms.) and 5.0 gms. of vinyl benzyl chloride are then charged and the bottle is capped. This is effected by inserting a long hollow needle through the septum and below the liquid level. Nitrogen is introduced through this needle and allowed to escape through a second hollow needle introduced through the septum and reaching only into the upper space of the bottle. Then 36.0 gms. of butadiene is added through a hollow needle inserted into the rubber septum. Just before the bottle is placed on a rocker in a 5° C. bath, 0.25 gm. of tetraethylenepentamine is inserted by means of a hypodermic needle. The bottle is agitated and maintained at 5° C. for 17 hours. Then unreacted butadiene is removed and the polymer product is recovered by dumping the reaction mass into isopropanol containing 1 percent of antioxidant. The coagulated product is recovered and dried overnight at 40° C. in a vacuum oven. Analysis of the polymer product shows a 44.0 percent yield which contains 19.5 percent styrene, 70.9 percent butadiene and 9.6 percent vinyl benzyl chloride. Analysis shows that the vinyl benzyl chloride is uniformly distributed throughout the polymer molecules. Measurement for green strength shows 82.0 psi initial, 151.0 psi at peak and 151.0 psi at break. The percent elongation is 500.0 percent.

EXAMPLE II

The procedure of Example I is repeated except that a polymerization temperature of 50° C. is used. The conversion is 72% and the analysis shows 9.8% vinyl benzyl chloride in the terpolymer. The green strength measures 45 psi initial, 46 psi at peak, 21 psi at break and 550% maximum elongation. This demonstrates that 50° C. polymerization temperature is not as effective as 5° C. with respect to improved green strength.

It has also been found that the green strength may be still further improved by reaction of the terpolymer with di(tertiary)-amines, such as tetramethylethylenediamine (TMEDA), N,N-dipiperdinyl-1,2-ethane (DPE), etc. The diamine serves as an ionic crosslinking agent to produce a thermally reversible crosslinking of the terpolymer. However, since the green strength is a property useful in the premolding stage, this improvement by ionic crosslinking is very useful. The following examples illustrate the improvement in green strength effected by ionic crosslinking with TMEDA and DPE.

EXAMPLE III

Three terpolymers are prepared according to the procedure of Example II using amounts of vinylbenzylchloride (VBC), styrene and butadiene to give the respective properties in the terpolymers shown below in Table I. Subsequent to coagulation a sufficient amount of TMEDA is milled into the polymer to give the VBC/TMEDA ratios reported in Table I. Tests in a standard tire rubber formulation are performed for green strength and elasticity on these crosslinked terpolymers and on a control which comprises a standard styrene-butadiene copolymer prepared by solution polymerization and used in commercial tire products. The results are shown in Table I.

TABLE I

|  | A | B | C | SBR Control |
|---|---|---|---|---|
| Terpolymer: |  |  |  |  |
| VBC (%) | 5.1 | 5.0 | 8.0 |  |
| Styrene (%) | 22.5 | 22.9 | 25.0 | 31 |
| Butadiene (%) | 73.4 | 72.1 | 67.0 | 69 |
| Mole Ratio: |  |  |  |  |
| VBC/TMEDA | 2.0 | 2.0 | 9.0 |  |
| Green Strength: |  |  |  |  |
| Initial (psi) | 54 | 49 | 90 | 60 |
| Peak (psi) | 120 | 101 | 240 | 142 |
| Break (psi) | 120 | 102 | 240 | 142 |
| Elongation (%) | 770 | 620 | 550 | 1250 |

EXAMPLE IV

The procedure of Example III is repeated using N,N'-dipiperidinyl-1,2-ethane in place of TMEDA. The various proportions and results are reported in Table II.

TABLE II

|  | D | E | F | G | H | SBR Control |
|---|---|---|---|---|---|---|
| Terpolymer: |  |  |  |  |  |  |
| VBC (%) | 1.2 | 1.2 | 1.2 | 2.0 | 2.0 |  |
| Styr. (%) | 26.7 | 26.7 | 26.7 | 25.1 | 25.1 | 31 |
| Bd. (%) | 72.1 | 72.1 | 72.1 | 72.9 | 72.9 | 69 |
| Mol. Wt. | 110,000 | 110,000 | 110,000 | 89,000 | 89,000 | 200,000 |
| Mole Ratio: |  |  |  |  |  |  |
| VBC/DPE | 4.0 | 2.0 | 3.0 | 4.0 | 3.0 |  |
| Green Strength: |  |  |  |  |  |  |
| Initial (psi) | 46 | 55 | 52 | 50 | 60 | 60 |
| Peak (psi) | 73 | 121 | 99 | 160 | 225 | 142 |
| Break (psi) | 58 | 102 | 97 | 145 | 225 | 142 |
| Elong. (%) | 545 | 845 | 500 | 885 | 960 | 1250 |

In Example I where the VBC content is 9.6%, the green strength values are much higher than for the control used in Examples III and IV. In Examples III and IV where the VBC content in the terpolymers is generally much lower, this is offset by the use of the diamines to bring the green strength values generally equivalent to those shown by the control.

Various other tertiary diamines may be used in addition to the TMEDA and DPE demonstrated above. These include tetraethylethylenediamine, tetramethylpropylenedaimine, N,N'-dimorpholino-1,2-ethane, N,N'-dithiomorpholino-1,2-ethane, N,N'-dipiperidinyl-1,2-cyclohexane, N,N'-dipiperidinyl-1,2-benzene, etc. Various other di-(tertiary)-amines suitable for the purpose of this invention are those disclosed in the Langer U.S. Pat. No. 3,451,988, particularly in columns 4 and 5.

The diamine is advantageously used in such a proportion as to give a VBC/diamine molar ratio of 1/1 to 15/1, preferably 2/1 to 10/1, depending somewhat on the proportion of VBC in the terpolymer. Obviously the higher the amount of VBC in the terpolymer the higher this ratio can be to give a satisfactory amount of crosslinking.

The thermally decomposable nature of the ionically crosslinked terpolymers may be demonstrated by the fact that the crosslinked terpolymer gives a gel in toluene. When this gel in toluene is heated at 90° C. for 1.5 hours a clear solution is obtained. However, when this solution is allowed to stand at room temperature for 3-4 days, it re-thickens to its original gel condition.

While certain features of this invention have been described in detail with respect to various embodiments thereof, it will of course be apparent that other modifications can be made within the spirit and scope of this invention and it is not intended to limit the invention to the exact details shown except insofar as they are defined in the following claims:

The invention claimed is:

1. A process for the preparation of a terpolymer of improved green strength comprising the steps of polymerizing in an aqueous emulsion at a temperature of 0°–30° C., a monomer mixture consisting essentially of 55–82 percent by weight of butadiene, 12–35 percent by weight of styrene and 8–20 percent by weight of vinyl benzyl chloride and thereafter reacting the resultant terpolymer with a compound having two tertiary amine groups therein.

2. The process of claim 1 in which said reaction with said amine compound is effected after said recovery step.

3. The process of claim 1 in which said amine compound is tetramethylethylenediamine.

4. The process of claim 1 in which said amine compound is N,N'-dipiperidinyl-1,2-ethane.

5. The process of claim 1 in which the amount of said amine compound reacted is sufficient to give a molar ratio of vinylbenzylchloride in said terpolymer to said amine compound in the range of 1/1 to 15/1.

6. The process of claim 5 in which said molar ratio is in the range of 2/1 to 10/1.

7. A thermally decomposable crosslinked copolymer produced by the process of claim 1.

* * * * *